(12) United States Patent
Sun et al.

(10) Patent No.: US 7,575,542 B1
(45) Date of Patent: Aug. 18, 2009

(54) APPARATUS FOR CHANGING BITS OF MACHINE TOOL

(76) Inventors: Ying Sun, No. 19, Alley 28, Lane 851, Jhongshan Rd., Shengang Township, Taichung County (TW) 429; Chi Sun, No. 19, Alley 28, Lane 851, Jhongshan Rd., Shengang Township, Taichung County (TW) 429

( * ) Notice: Subject to any disclaimer, the term of this patent is extended or adjusted under 35 U.S.C. 154(b) by 0 days.

(21) Appl. No.: 12/229,018

(22) Filed: Aug. 19, 2008

(51) Int. Cl.
*B23Q 3/157* (2006.01)
(52) U.S. Cl. .............................. 483/39; 483/56; 483/900
(58) Field of Classification Search ................... 483/39, 483/900, 54, 55, 56, 57, 38, 41, 40, 67
See application file for complete search history.

(56) References Cited

U.S. PATENT DOCUMENTS

| | | | | |
|---|---|---|---|---|
| 4,813,122 A | * | 3/1989 | Watanabe et al. ............. | 483/57 |
| 4,873,756 A | * | 10/1989 | Yamane et al. ................ | 483/56 |
| 5,499,963 A | * | 3/1996 | Fujimoto et al. .............. | 483/56 |
| 7,300,393 B2 | * | 11/2007 | Fujimoto et al. .............. | 483/56 |
| 7,445,587 B2 | * | 11/2008 | Kojima et al. ................. | 483/56 |
| 2005/0009679 A1 | * | 1/2005 | Fujimoto et al. .............. | 483/39 |
| 2006/0094575 A1 | * | 5/2006 | Fujimoto et al. .............. | 483/39 |
| 2007/0225139 A1 | * | 9/2007 | Kojima et al. ................. | 483/39 |

* cited by examiner

*Primary Examiner*—Erica E Cadugan
(74) *Attorney, Agent, or Firm*—Charles E. Baxley

(57) ABSTRACT

A machine tool is provided with a bit-changing apparatus including a cam, a rocker, a roller, a linkage, a pulling element, a disc and clips. The cam is attached to the machine tool. The roller is attached to the rocker and movable against the cam. The linkage includes at least one track attached to the machine tool, a sliding element attached to another end of the rocker and movable on the track, and a connecting rod formed with an end pivotally connected to the machine tool and another end pivotally connected to the rocker. The pulling element is provided between the rocker and the machine tool so that the roller is kept against the cam. The disc is rotationally supported on the rocker. Each of the clips is attached to the disc and used to clip a holder for holding a bit so that a selected bit can be engaged with a bit-driving unit of the machine tool.

4 Claims, 7 Drawing Sheets

APPARATUS FOR CHANGING BITS OF MACHINE TOOL

FIELD OF INVENTION

The present invention relates to a machine tool and, more particularly, to an apparatus for changing bits of a machine tool.

BACKGROUND OF INVENTION

Referring to FIG. 1, a conventional machine tool includes a bit-driving unit 10 and a bit-changing unit. The bit-changing unit is used to carry and change holders 24 for holding bits so that a selected one of the bits is engaged with the bit-driving unit 10. The conventional machine tool includes a beam 2 formed thereon, a supporting element 12 connected to the beam 2 and a pinion 11 provided thereon. The bit-changing unit includes a rocker 25 connected to the supporting element 12 with a pivot 14 and a disc 20 rotationally connected to the rocker 25. A gear 23 is engaged with the pinion 11 and a reduction device 22 is provided between the disc 20 and the gear 23 so the disc 20 is operated at a low speed as the pinion 11 is operated at a high speed. A roller 18 is supported on the rocker 25 and movable against a cam 13 attached to the bit-driving unit 10. The cam 13 includes an upper rectilinear section 15, a lower rectilinear section 17 and an arched section 16 formed below the upper rectilinear section 15 and the lower rectilinear section 17. A pulling element 26 such as a spring is provided between the rocker 25 and the bit-driving unit 10. In use, one of the holders 24 is engaged with the bit-driving unit 10, and the bit-driving unit 10 is located in a lower position where the roller 18 is in contact with the upper rectilinear section 15 of the cam 13. To change the holder 24 with another holder 24, the bit-driving unit 10 is lifted to a middle portion where the roller 18 is in contact with an upper end of the arched section 16 of the cam 13. The pulling element 26 pivots the rocker 25 about the pivot 14 so that one of the clips 21 is moved towards the holder 24. Then, the bit-driving unit 10 is stopped. The pulling element 26 further pivots the rocker 25 so that the clip 21 is engaged with the holder 24, i.e., the clip 21 enters a V-shaped recess defined in the holder 24. The bit-driving unit 10 is lifted to an upper position so that the holder 24 is disengaged from the bit-driving unit 10.

Referring to FIG. 2, there is shown another conventional machine tool including a bit-driving unit 10 and a bit-changing unit. The bit-changing unit includes a rocker 25 pivotally connected to the machine tool with a pivot 14. A disc 20 is rotationally connected to the rocker 25. Clips 21 are attached to the disc 20. The clips 21 are used to clip holders 24. A pulling element 26 is provided between the rocker 25 and the machine tool. A roller 31 is attached to the rocker 25. A lower track 30 is attached to the bit-driving unit 10. The roller 31 is movable against the lower track 30. An end of the lever 32 is connected to the bit-driving unit 10. A roller 33 is attached to another end of the lever 32. An upper track 34 is attached to the machine tool. The upper track 34 includes a groove for receiving the roller 33 so that the lever 32 is pivoted when the roller 33 is rolled in the groove of the upper track 34 as the bit-driving unit 10 is moved vertically. A threaded bolt 35 is connected to the lever 32. A nut 36 is engaged with the threaded bolt 36. The nut 36 can be abutted against an element 37 to prevent undesired rotation of an element 38 and the disc 20.

In the conventional bit-changing units, a selected one of the clips 21 is movable along an arched path while a related one of the holders 24 is movable along a vertical path. The arched path intersects with the vertical path at only a point. The selected clip 21 will hit and damage the related holder 24 if the latter is kept in position while the former is moved to the latter. To avoid this problem, the related holder 24 is moved slightly when the selected clip 21 is moved thereto. This requires precise operation of a complicated mechanism.

The present invention is therefore intended to obviate or at least alleviate the problems encountered in prior art.

SUMMARY OF INVENTION

It is the primary objective of the present invention to provide a simple and durable bit-changing apparatus for use in a machine tool.

To achieve the foregoing objective, the bit-changing apparatus includes a cam, a rocker, a roller, a linkage, a pulling element, a disc and clips. The cam is attached to the machine tool. The roller is attached to the rocker and movable against the cam. The linkage includes at least one track, a sliding element and a connecting rod. The track is attached to the machine tool. The sliding element is attached to another end of the rocker and movable on the track. The connecting rod is formed with an end pivotally connected to the machine tool and another end pivotally connected to the rocker. The pulling element is provided between the rocker and the machine tool so that the roller is kept against the cam. The disc is rotationally supported on the rocker. Each of the clips is attached to the disc and used to clip a holder for holding a bit so that a selected bit can be engaged with a bit-driving unit of the machine tool.

Other objectives, advantages and features of the present invention will become apparent from the following description referring to the attached drawings.

BRIEF DESCRIPTION OF DRAWINGS

The present invention will be described via the detailed illustration of the preferred embodiment referring to the drawings.

The present invention will be described via detailed illustration of the preferred embodiment referring to the drawings.

DETAILED DESCRIPTION OF PREFERRED EMBODIMENT

Figure 1:
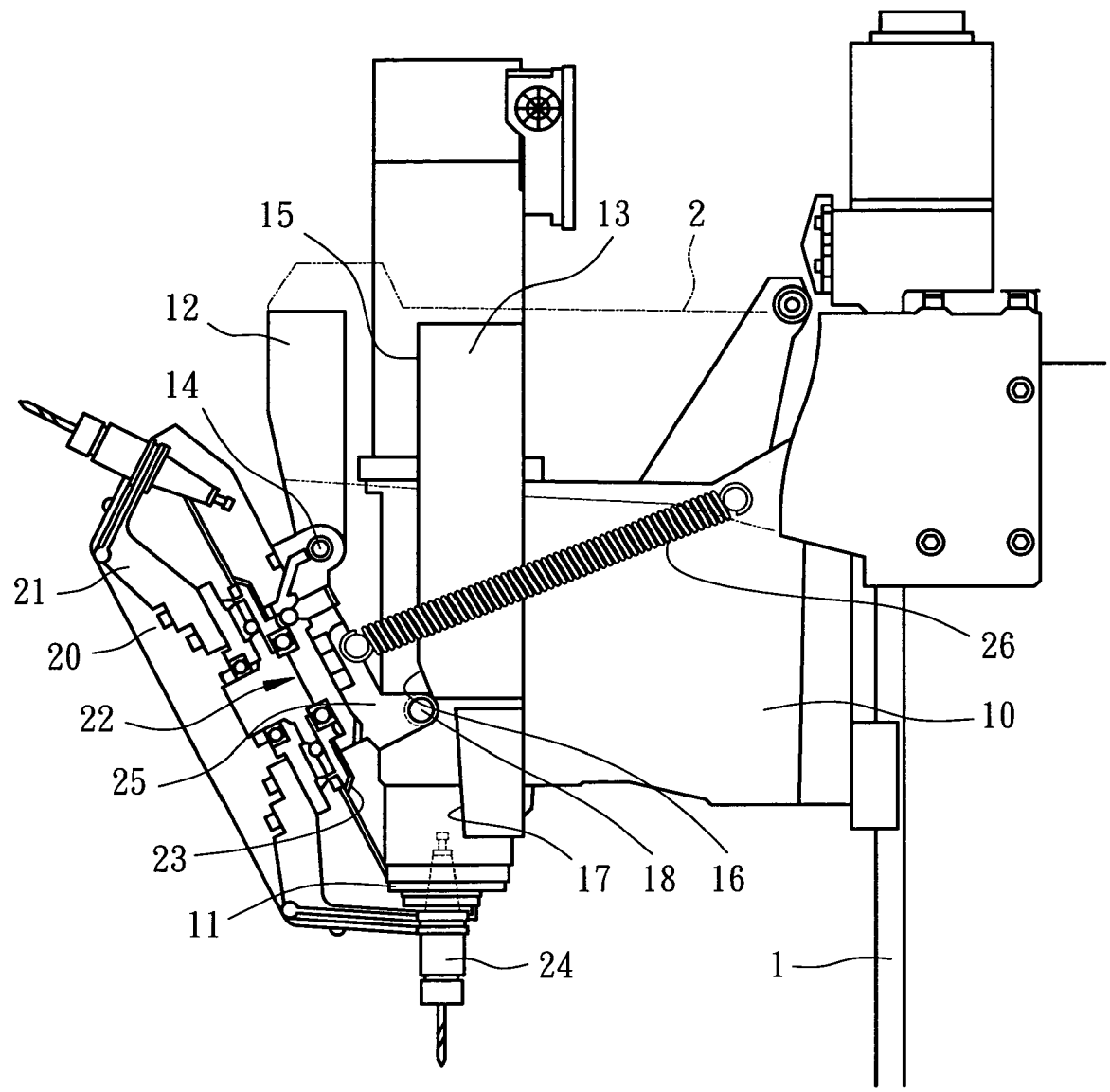
FIG. 1 is a partial side view of a conventional machine tool equipped with a bit-changing apparatus.
Figure 2:
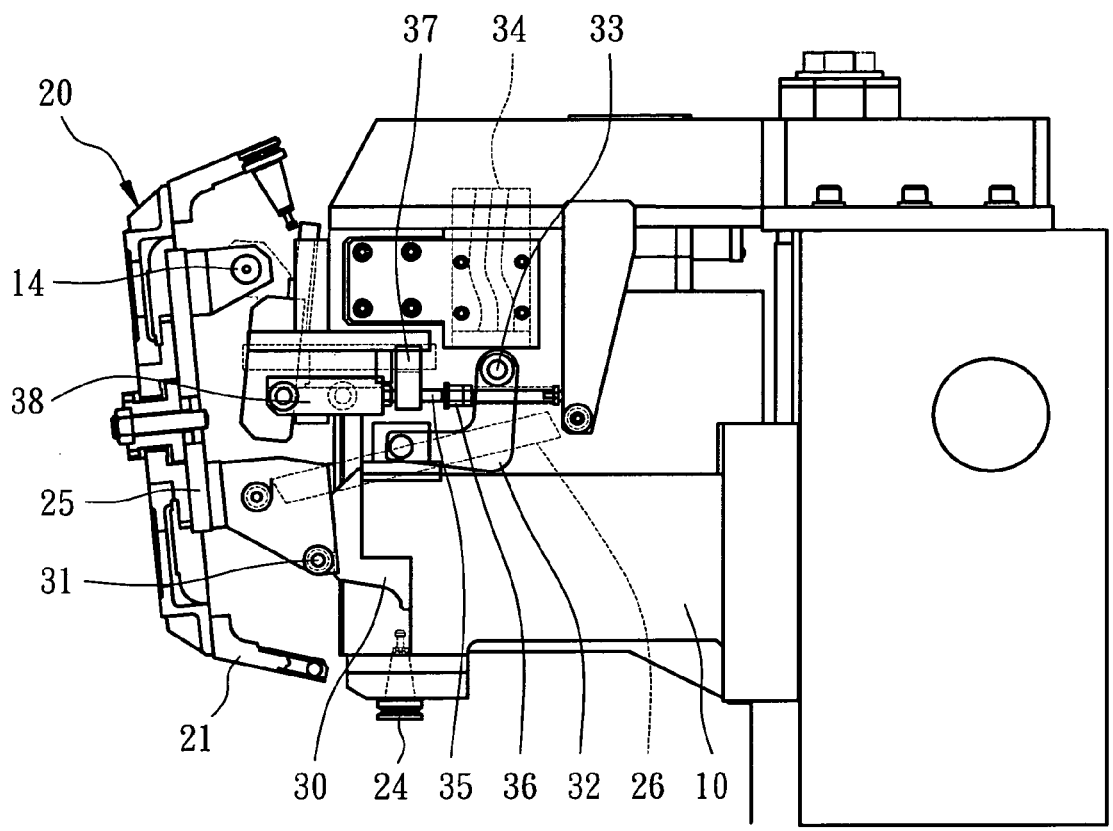
FIG. 2 is a partial side view of another conventional machine tool equipped with a bit-changing apparatus.
Figure 3:
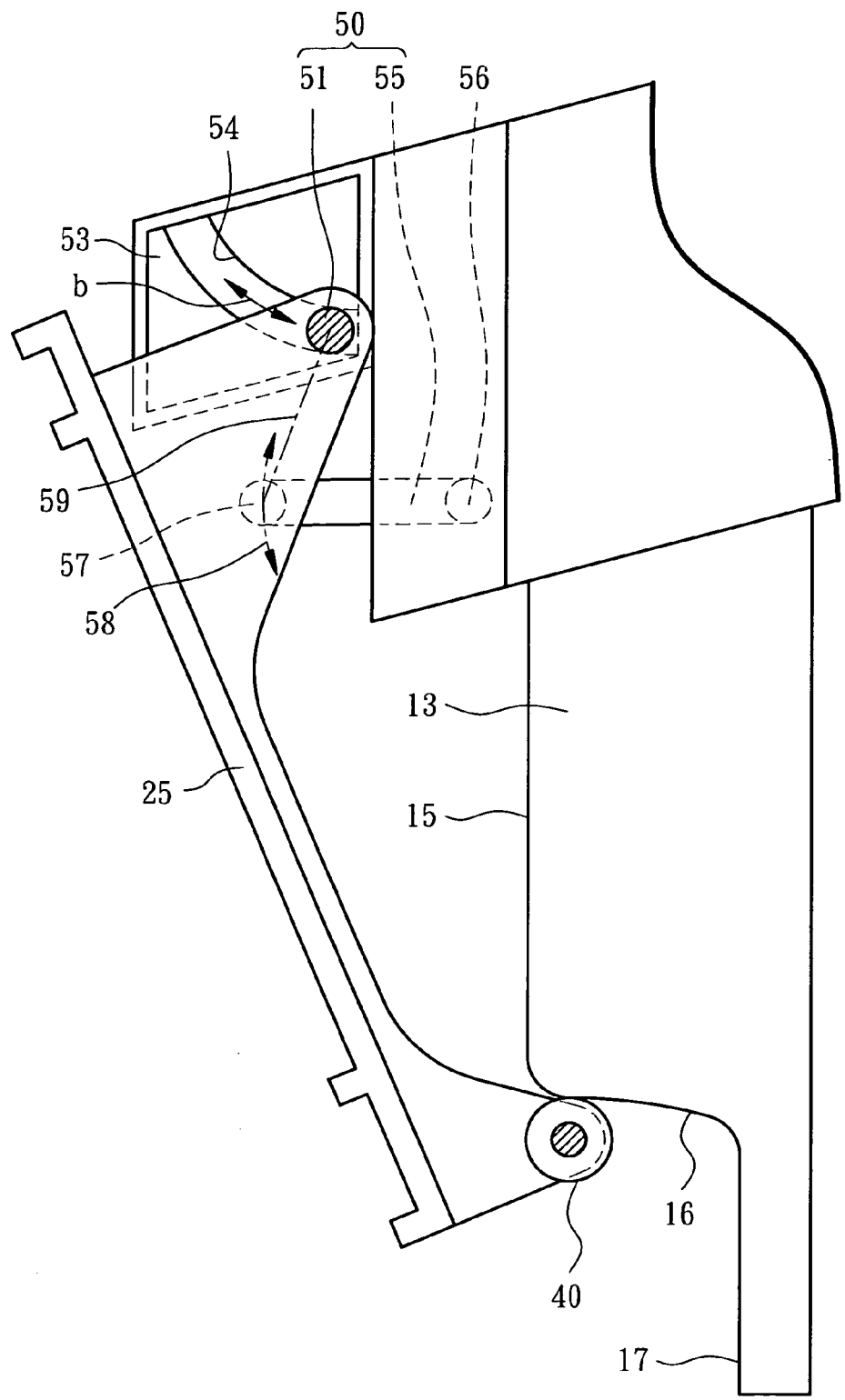
FIG. 3 is a side view of a bit-changing apparatus according to the preferred embodiment of the present invention.
Figure 4:
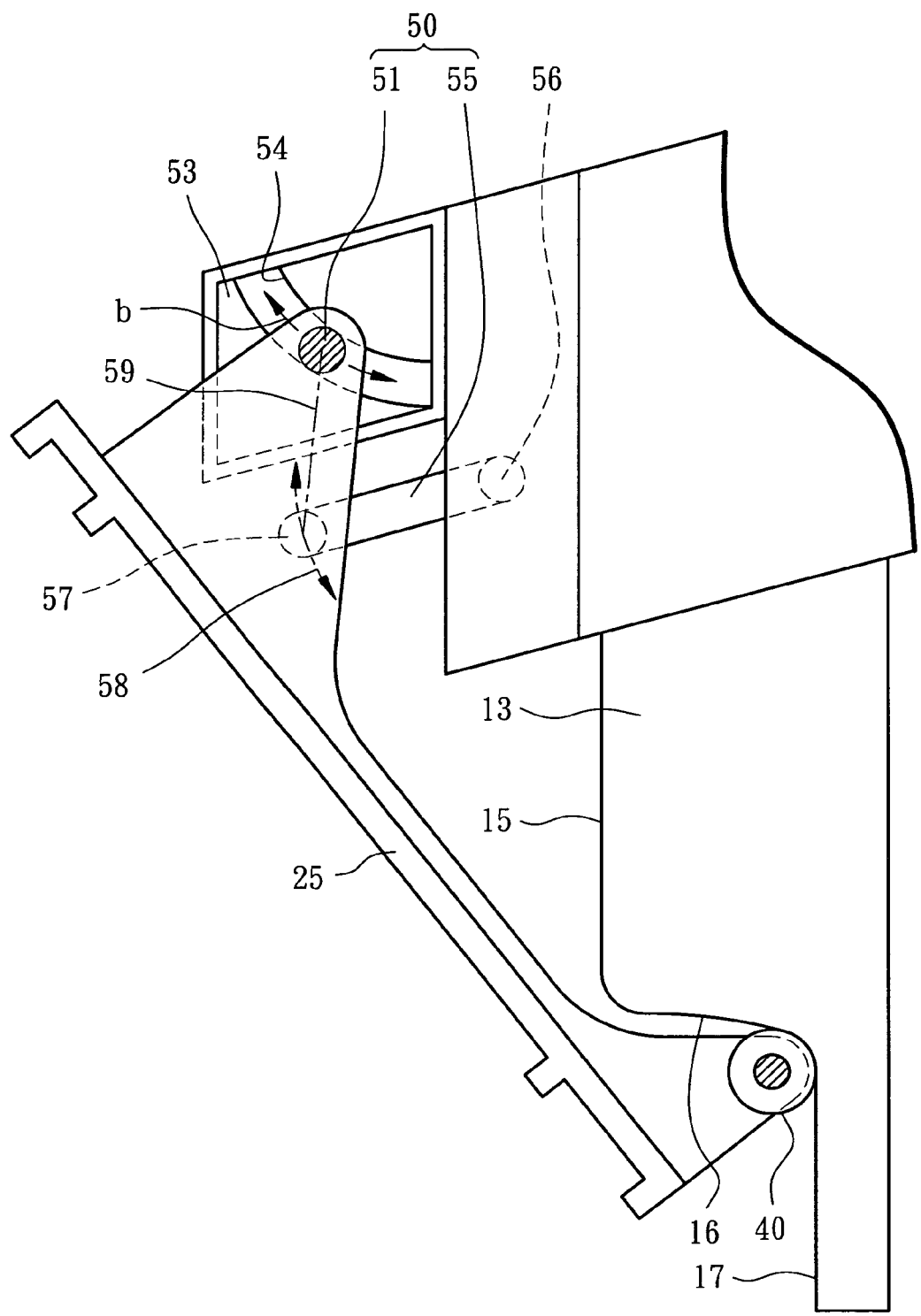
FIG. 4 is side view of the bit-changing apparatus in another position than shown in FIG. 3.

Referring to FIGS. 3 through 7, a machine tool is equipped with a bit-changing apparatus according to the preferred embodiment of the present invention. The machine tool includes a post 1, a beam 2 connected to the post 1, a supporting element 12 attached to the beam 2 and a bit-driving unit 10 vertically movable thereon. The bit-changing unit is used to carry and change holders 24 for holding bits so that a selected one of the bits can be engaged with the bit-driving unit 10.

The bit-changing unit includes a cam 13 attached to the bit-driving unit 10, a linkage 50 connected to the supporting element 12, a rocker 25 connected to the linkage 50 and a disc 20 rotationally connected to the rocker 25. A reduction device 22 is connected to the disc 20 so that the disc 20 is operated at a low speed. The cam 13 is formed with an upper rectilinear section 15, a lower rectilinear section 17 and a curved section 16 between the upper rectilinear section 15 and the lower rectilinear section 17. A roller 40 is attached to a lower end of the rocker 25 and movable against the cam 13 attached to the bit-driving unit 10. A pulling element 26 is provided between the rocker 25 and the bit-driving unit 10 so that the roller 40 is retained against the cam 13. The pulling element 26 is preferably a spring.

The linkage 50 includes a sliding element 51, a frame 52, at least one track 53 and a connecting rod 55. The sliding element 51 is in the form of a pin attached to an upper end of the rocker 25. The frame 52 is attached to the supporting element 12. The track 53 is preferably a plate attached to the frame 52 and formed with an arched groove 54 for receiving an end of the sliding element 51. An end of the connecting rod 55 is pivotally connected to the supporting element 12 with a pivot 56. Another end of the connecting rod 55 is pivotally connected to the rocker 25 with a pivot 57.

The roller 40 is rolled against the curved section 16 of the cam 13 as the sliding element 51 is moved along an arched path b while the pivot 57 is moved along an arched path 58. At the same time, a phantom line 59 between the axis of the sliding element 51 and the axis of the pivot 57 is pivoted. As clearly shown in FIGS. 3 and 4, the curved section 16 of the cam 13 is substantially horizontal.

In operation, one of the holders 24 (the "current holder 24") is engaged with the bit-driving unit 10. The bit-driving unit 10 is in a position where the roller 40 is in contact with the upper rectilinear section 15 of the cam 13.

To change the current holder 24 with another holder 24 (the "new holder 24"), the bit-driving unit 10 is lifted. In a first phase of the lifting of the bit-driving unit 10, the angle of the rocker 25 is not changed as the roller 40 rolls on the upper rectilinear section 15 of the cam 13.

Figure 5:
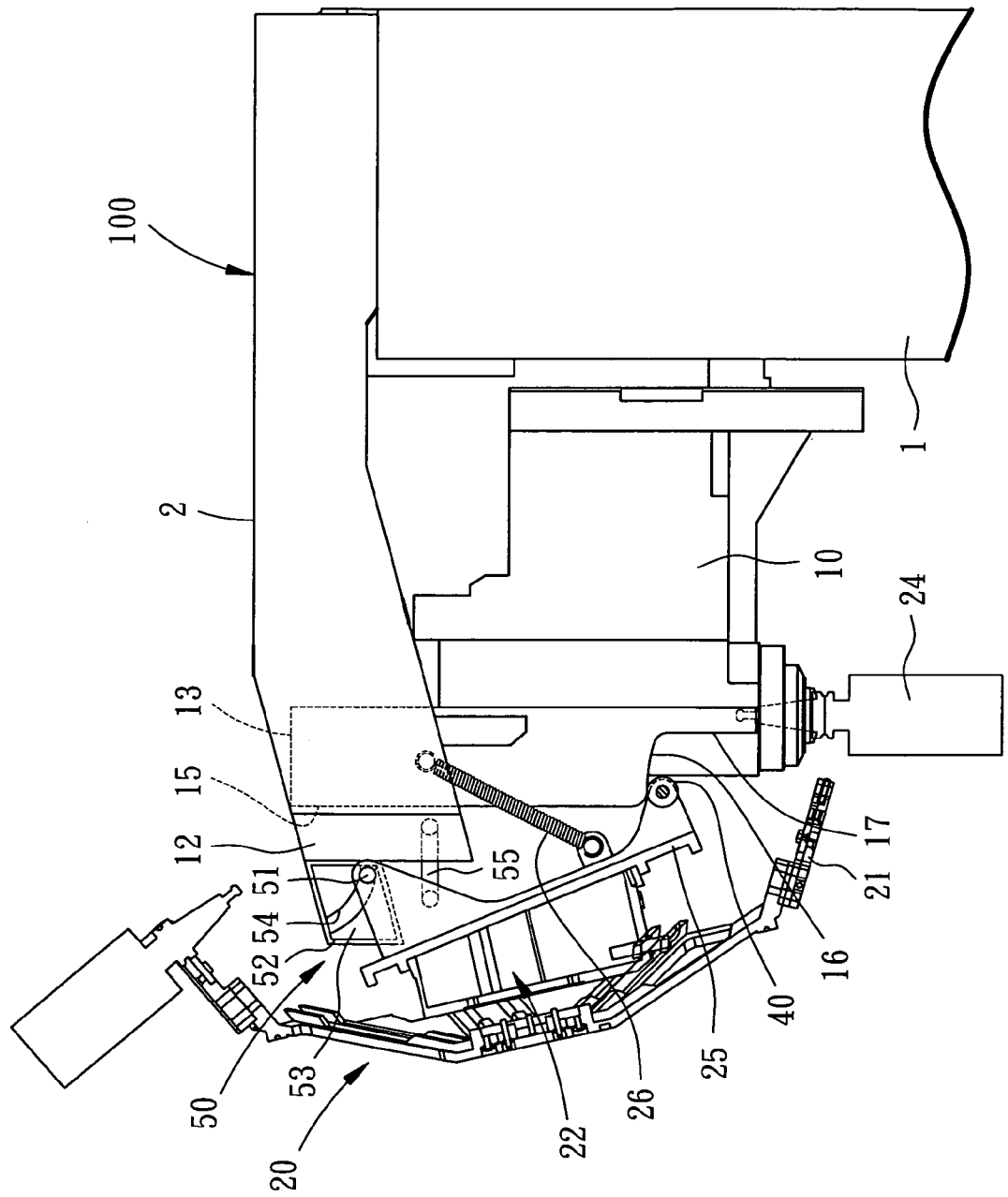
FIGS. 5 through 7 are partial side views of a machine tool equipped with the bit-changing apparatus shown in FIG. 3.
Figure 6:
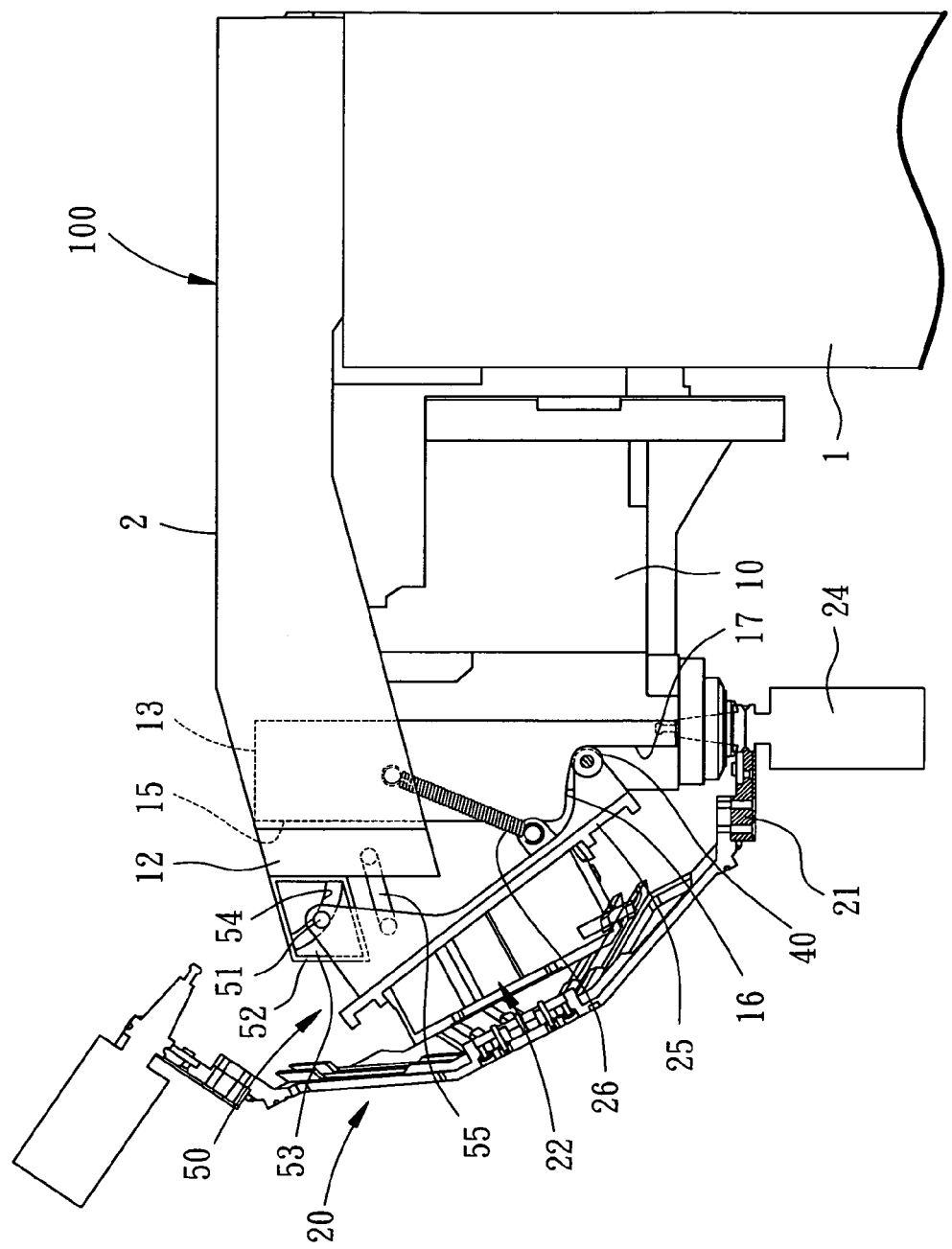

Referring to FIG. 5, after the first phase of the lifting of the bit-driving unit 10, the roller 40 reaches a first end of the arched section 16 of the cam 13, and the lifting of the bit-driving unit 10 is stopped. The pulling element 26 causes the rocker 25 to move so that the roller 40 moves to a second end of the arched section 16 of the cam 13 as shown in FIG. 6. The sliding element 51 moves in the arched groove 54. The movement of the roller 40 along the curved section 16 of the cam 13 is substantially horizontal so that the movement of a selected one of the clips 21 is substantially horizontal. Thus, the engagement of the clip 21 with the current holder 24 is smooth and gentle. Therefore, the hit and damage of the holder 24 by the clip 21 is mild.

Figure 7:
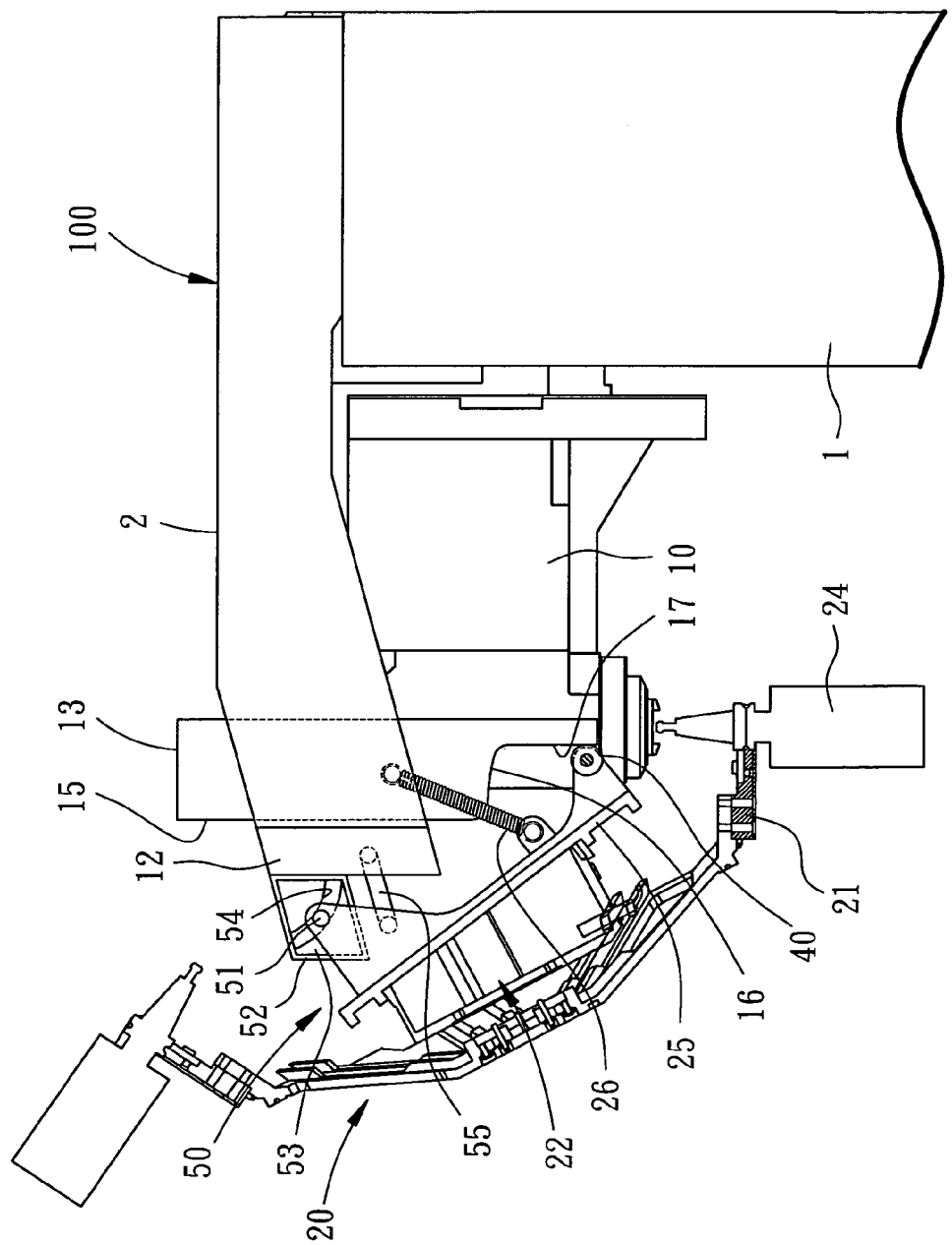

Referring to FIG. 7, in a second phase of the lifting of the bit-driving unit 10, the bit-driving unit 10 is disengaged from the current holder 24 while the current holder 24 is engaged with the clip 21.

Then, the disc 20 is rotated on the rocker 25 so that the new holder 24 is moved near the bit-driving unit 10. The bit-driving unit 10 is lowered so that the new holder 24 is engaged with the bit-driving unit 10. The foregoing process is reversed so that the related clip 21 is disengaged from the new holder 24.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A bit-changing apparatus for use in a machine tool comprising:
   a cam attached to the machine tool;
   a rocker;
   a roller attached to an end of the rocker and movable against the cam;
   a linkage comprising:
      at least one track attached to the machine tool;
      a sliding element attached to another end of the rocker and movable on the track; and
      a connecting rod formed with an end pivotally connected to the machine tool and another end pivotally connected to the rocker;
   a pulling element provided between the rocker and the machine tool so that the roller is kept against the cam;
   a disc rotationally supported on the rocker; and
   clips attached to the disc and each used to clip a holder for holding a bit so that a selected bit can be engaged with a bit-driving unit of the machine tool.

2. The bit-changing apparatus according to claim 1, wherein the sliding element is in the form of a pin.

3. The bit-changing apparatus according to claim 2, wherein the track is a plate comprising a groove defined therein for receiving an end of the sliding element.

4. The bit-changing apparatus according to claim 3, wherein the linkage includes a frame for supporting the track on the machine tool.

* * * * *